United States Patent
Forrest et al.

(10) Patent No.: US 9,542,316 B1
(45) Date of Patent: Jan. 10, 2017

(54) SYSTEM AND METHOD FOR ADAPTATION OF COHERENCE MODELS BETWEEN AGENTS

(71) Applicant: Arteris, Inc., Campbell, CA (US)

(72) Inventors: Craig Stephen Forrest, San Francisco, CA (US); David A. Kruckemyer, San Jose, CA (US)

(73) Assignee: ARTERIS, INC., Campbell, CA (US)

( * ) Notice: Subject to any disclaimer, the term of this patent is extended or adjusted under 35 U.S.C. 154(b) by 0 days.

(21) Appl. No.: 14/970,467

(22) Filed: Dec. 15, 2015

Related U.S. Application Data

(63) Continuation-in-part of application No. 14/806,786, filed on Jul. 23, 2015.

(51) Int. Cl.
| | |
|---|---|
| *G06F 12/00* | (2006.01) |
| *G06F 12/08* | (2016.01) |
| *G06F 13/00* | (2006.01) |
| *G06F 13/28* | (2006.01) |
| *G06F 9/30* | (2006.01) |

(52) U.S. Cl.
CPC ......... *G06F 12/0815* (2013.01); *G06F 9/3017* (2013.01)

(58) Field of Classification Search
CPC .............................. G06F 12/0815; G06F 9/3017
See application file for complete search history.

(56) References Cited

U.S. PATENT DOCUMENTS

| | | | | | |
|---|---|---|---|---|---|
| 5,146,603 | A * | 9/1992 | Frost | .................. | G06F 12/0831 711/143 |
| 5,226,144 | A * | 7/1993 | Moriwaki | ........... | G06F 12/0833 711/121 |
| 5,659,710 | A * | 8/1997 | Sherman | ............. | G06F 12/0831 711/146 |
| 6,275,900 | B1 * | 8/2001 | Liberty | ............... | G06F 12/0813 711/120 |
| 6,321,304 | B1 * | 11/2001 | James | ................. | G06F 12/0824 711/102 |
| 8,862,801 | B2 * | 10/2014 | Saripalli | ............. | G06F 9/30087 710/100 |
| 2002/0129211 | A1 * | 9/2002 | Arimilli | .............. | G06F 12/0831 711/146 |
| 2003/0018739 | A1 * | 1/2003 | Cypher | ............... | G06F 12/0831 709/213 |
| 2004/0111563 | A1 * | 6/2004 | Edirisooriya | ....... | G06F 12/0831 711/141 |
| 2005/0160230 | A1 * | 7/2005 | Doren | ................. | G06F 12/0828 711/141 |

* cited by examiner

*Primary Examiner* — Mark Giardino, Jr.

(57) ABSTRACT

A system and method are disclosed for multiple coherent caches supporting agents that use different, incompatible coherence models. Compatibility is implemented by translators that accept coherency requests and snoop responses from an agent and accept snoop requests and coherency responses from a coherence controller. The translators issue corresponding coherency requests and snoop responses to the coherence controller and issue corresponding coherency responses and snoop requests to the agent. Interaction between translators and the coherence controller accord with a generic coherence model, which may be a subset, superset, or partially inclusive of features of any native coherence model. A generic coherence protocol may include binary values for each of characteristics: valid or invalid, owned or non-owned, unique or shared, and clean or dirty.

15 Claims, 13 Drawing Sheets

| State | I/V | N/O | S/U | C/D |
|---|---|---|---|---|
| Invalid | I | --- | --- | --- |
| Shared | V | N | S | C |
| Forward | V | O | S | C |
| Owned | V | O | S | D |
| Exclusive | V | O | U | C |
| Modified | V | O | U | D |

FIG. 6

SYSTEM AND METHOD FOR ADAPTATION OF COHERENCE MODELS BETWEEN AGENTS

CROSS REFERENCE TO RELATED APPLICATIONS

This application is related to and a continuation-in-part of US Non-Provisional Utility patent application Ser. No. 14/806,786 titled DISTRIBUTED IMPLEMENTATION FOR CACHE COHERENCE filed on Jul. 23, 2015 by FORREST, Craig Stephen et al., the entire disclosure of which is incorporated herein by reference.

FIELD OF THE INVENTION

The invention is in the field of system-on-chip (SoC) and, more specifically, heterogeneous processing units, including processor cores, graphics processing units, and other components that manipulate or move data.

BACKGROUND

Modern systems-on-chip (SoCs) are often designed with heterogeneous processing units that are selected for their different system characteristics. Typically, a processing unit, or agent, implements a cache for storing a local copy of data, and that agent assumes a particular coherence model, which defines a set of cache states and a set of coherent transactions that effect transitions between cache states. A coherence model enforces data coherence among agents that share the same coherence model.

However, different processing units, delivered as intellectual property blocks from different vendors, may implement different and incompatible coherence models, making integration of those processing units in a SoC difficult if not impossible. As a result, a SoC designer is faced with either higher design costs and longer development cycles or selection of compatible, but less optimal, processing units.

SUMMARY OF THE INVENTION

The invention described herein directly addresses integrating incompatible coherence models implemented by heterogeneous agents. According to an aspect of the invention, a translator is used to adapt between different coherence models. A translator intermediates the exchange of coherency requests and responses between an agent and a coherence controller. In some embodiments the same or a different translator intermediates the exchange of snoop requests and responses between a coherence controller and an agent. In some embodiments the same or a different translator intermediates the exchange of snoop requests and responses between a coherence controller, the snooped agent, and the initiating agent. In some embodiments the coherence controller has a coherence model that includes a cache state model with a state that is not supported by the coherence model of the agent. In some embodiments the agent has a coherence model that includes a cache state model with a state that is not supported by the coherence model of the coherence controller.

In some embodiments the coherence controller has a coherence model that supports a type of snoop request that is not supported by the coherence model of the agent. In some embodiments the agent has a coherence model that includes a type of snoop request that is not supported by the coherence model of the coherence controller.

According to an aspect of the invention, the translator is configured with awareness of the allowable states and behaviors of the coherence model on each of its interfaces. The translator issues one or more requests and responses within the scope of the states and behaviors or the destination that provide for the functionality required by the allowed states and behaviors of the source. According to an aspect of the invention, the translator makes the coherence model of agents and coherence controllers transparent to each other so that each only need be designed according to its coherence protocol, and a correctly functioning system may be implemented.

BRIEF DESCRIPTION OF THE DRAWINGS

FIG. 6 illustrates a table of native states and equivalent generic representations.

DETAILED DESCRIPTION

Figure 1:
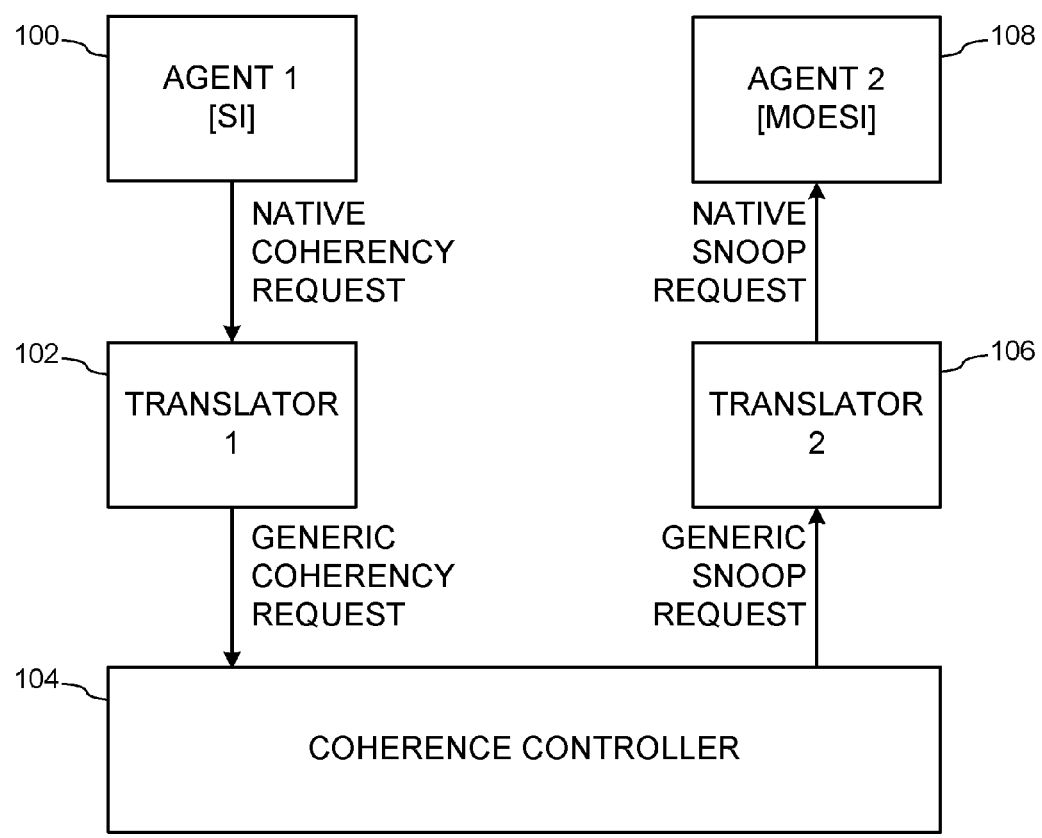
FIG. 1 illustrates a system of heterogeneous caching agents with translators to a generic model.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

A processing unit may implement caches and a coherence model, within which the processing unit is known as an agent. According to the various aspects of the invention a coherence model describes the following:

the cache state model, which defines the set of cache states, the properties of those states, and the permitted agent operations allowed by those states;

the transaction processing model, which defines the set of transactions, the cache state transitions resulting from those transactions, the serialization and interlocking behavior of transactions, and the resource management performed by transactions; and the coherence granules, which defines the sizes of caches lines on which coherence is maintained.

A coherence model may permit agents to implement a subset of the cache states defined by the cache state model and this subset is known as an agent cache state model. Different agent cache state models within a given coherence model are compatible by definition.

Finally, a coherence model may also define additional characteristics and behaviors not described above.

Cache coherence is maintained by hardware across multiple agents with caches in accordance with the coherence model implemented by those agents; these agents are known as cache-coherent agents. In addition, a coherence model may define agents that initiate coherent transactions but that implement caches that do not need to be kept coherent with other agents' caches; these agents are known as IO-coherent agents. Furthermore, a coherence model may enable such caches to be kept coherent by software.

According to an aspect of the invention, a coherence model applies to both cache-coherent agents and IO-coherent agents and is relevant whether an individual cache is kept coherent by hardware or software. Both types of agents are collectively called coherent agents.

In a system of multiple coherent caching agents, the hardware block that enforces coherence is the coherence controller. The coherence controller is coupled to each coherent agent. The coupling can be direct or indirect, such as through a network-on-chip or any other means of interconnect. In some embodiments the coherence controller is distributed and partitioned by cache line address. In such a system, an initiating agent issues coherency requests to the coherence controller, which in turn might issue resulting snoop requests to snooped agents. The snooped agents must, in turn, issue snoop responses, the results of which are typically aggregated by the coherence controller, which, in turn, returns a coherency response to the initiating agent. In some embodiments, the coherence controller implements a snoop filter to track the cache states of a cache line in each agent, and based on the state of the snoop filter, the coherence controller may issue snoop requests to a subset of agents.

As described above, each agent uses a particular coherence model, and assumes that all other coherent agents use the same model. In accordance with some aspects and some embodiments of the invention, multiple coherent agents use the same coherence model. In heterogeneous systems of agents with different coherence models, the coherence controller must accept coherency requests and issue coherency responses to an initiating agent according to its coherence model and issue snoop requests and accept snoop responses each according to the coherence model of the particular snooped agent. To do so, translation must be performed between coherence models.

In accordance with the aspects of the invention, translation can be performed in a distinct and/or dedicated translator unit, as a function of the coherence controller, and/or in an interface unit connected to an agent. The functionality of a translator unit can be divided into sub-units, such as a request sub-unit and a response sub-unit, or such as a coherency sub-unit that translates coherency requests and responses and a snoop sub-unit that translates snoop requests and responses. For clarity, embodiments disclosed indicate a distinct, dedicated translator, though this should not be construed as limiting the scope of the disclosed invention.

In accordance with the various aspects of the invention, coherent systems include fully-coherent (FC) agents and/or IO-coherent (IO) agents. An agent communicates using its own native protocol or the generic protocol. Furthermore, a cache-coherent system includes at least one FC agent; if all agents are IO, then that is similar to all agents being non-coherent. Additionally, agents can act as either a requesting agent or a snooped agent; an FC agent can act as both, but an IO agent can only act as a requesting agent.

FIG. 1 shows, in accordance with some aspects of the invention, one embodiment of a system according to the invention. Initiating agent 100 uses a coherence model that has two states, S and I. Agent 100 issues coherency requests to translator 102 according to its native coherence model. Those cause translator 102 to issue coherency requests to coherence controller 104 according to a generic protocol. To control the cache in another agent, coherence controller 104 issues snoop requests to translator 106 according to the generic coherence model. Those cause translator 106 to issue snoop requests to snooped agent 108 according to its native coherence model. Agent 108 supports five states, M, O, E, S, and I. The coherence models of agent 100 and agent 108 are different and not directly compatible.

Figure 2:
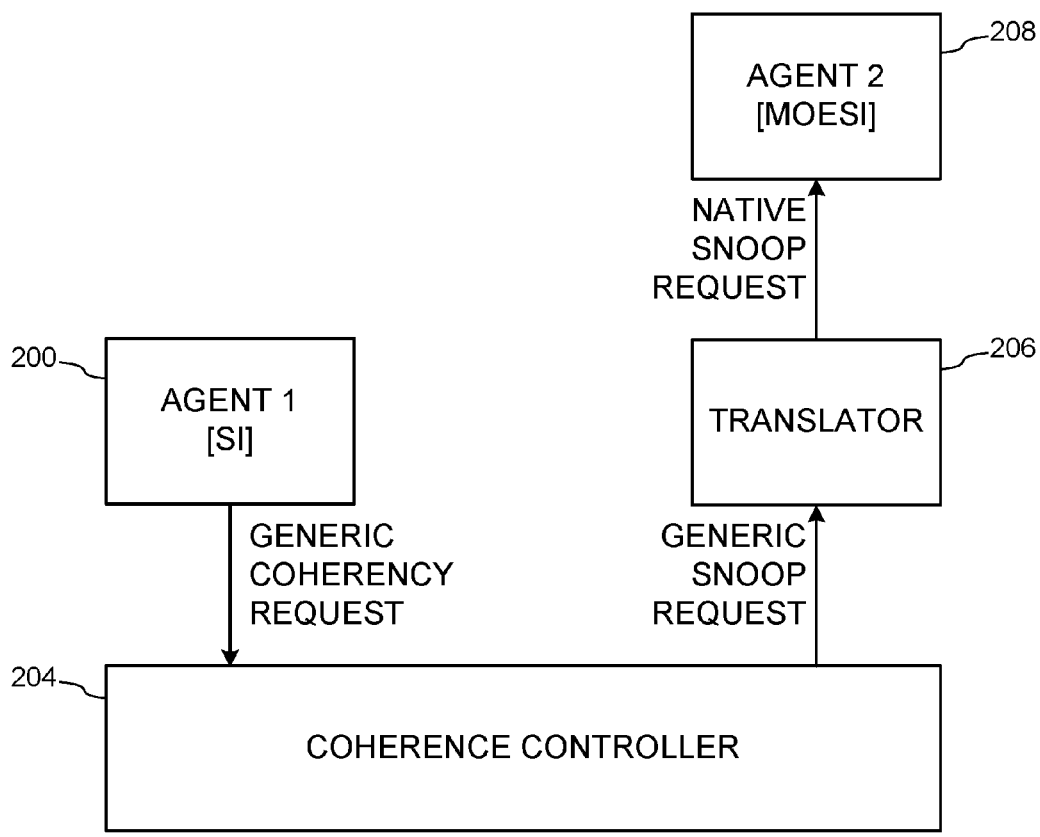
FIG. 2 illustrates a system of heterogeneous caching agents, one using a generic model with no translation.

FIG. 2 shows, in accordance with some aspects of the invention, another embodiment, wherein an agent uses a generic coherence model. SI initiating agent 200 issues coherency requests directly to coherence controller 204 according to a generic protocol. To control the cache in another agent, coherence controller 204 issues snoop requests to translator 206 according to the generic coherence model. The snoop requests cause translator 206 to issue snoop requests to MOESI agent 208 according to its native coherence model.

Figure 3:
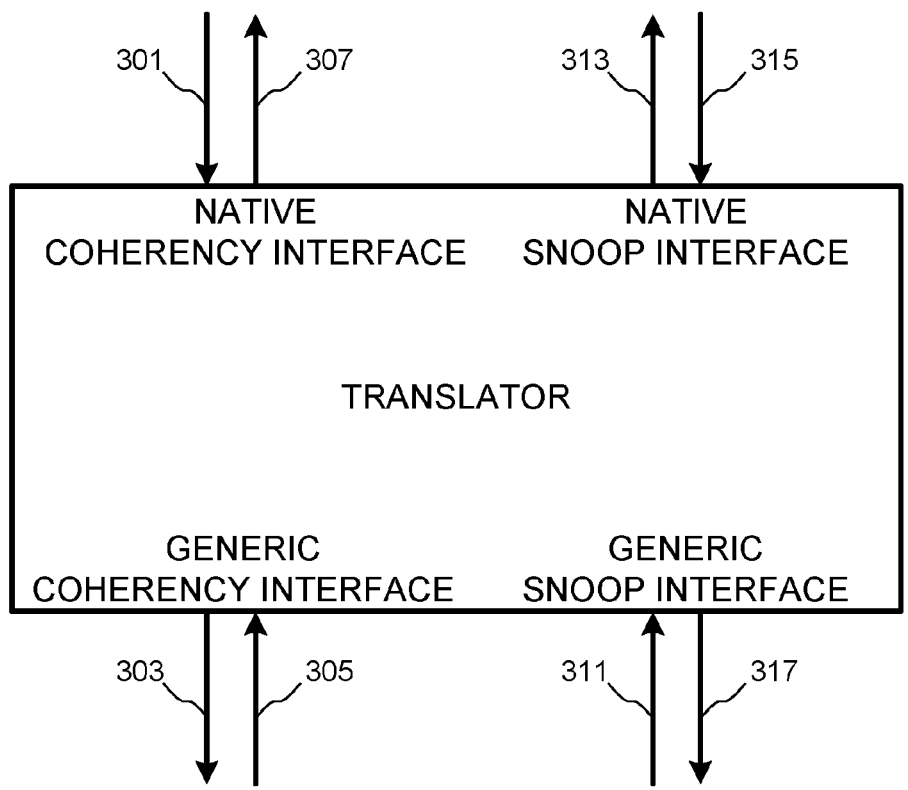
FIG. 3 illustrates a translator between a native and a generic coherence model.

FIG. 3 shows, in accordance with various aspects of the invention, an embodiment of a translator according to various aspects of the invention. It comprises coherency request and response and snoop request and response on each of an agent native interface and a coherence controller generic interface. Translators may be built with subsets of interface signals, and the embodiment shown should not be construed as limiting. The translator receives coherency requests from an agent on native interface signals 301. It reacts by issuing one or more coherency requests to the coherence controller on generic interface signals 303. Multiple requests may occur if, for instance, a transaction must be split, e.g. in the case that the transaction address and length exceed the size of a coherence granule in the generic coherence model or crosses a defined address range boundary. Eventually the coherence controller will respond on generic interface signals 305 to each coherency request issued on generic interface signals 303. A corresponding coherency response will be issued to the connected agent on native interface signals 307 for each coherency request issued on native interface signals 301. When a native coherency request is split into multiple generic coherency requests, the translator gathers and assembles the multiple generic coherency responses into a single native coherency response.

Simultaneously, and in response to coherency requests initiated by other agents, the connected coherence controller may issue snoop requests to the translator through generic interface signals 311. The translator will react by issuing one or more corresponding snoop requests to the connected agent on native interface signals 313. In response to each snoop request, the connected agent will issue a snoop response on native interface signals 315. Snoop responses may or may not carry data, depending on the type of snoop request and the state of the requested line in the agent cache. Upon receiving a snoop response from the agent, the translator issues a corresponding snoop response to the coherence controller on generic interface signals 317. When multiple snoop requests are issued on the native snoop interface, the translator gathers and assembles the multiple native snoop responses into a single generic snoop response.

In some embodiments, native coherency response signals 307 and native snoop response signals 315 may be split into a state response group and a data response group depending on the requirements of the native coherence model. In addition, in some embodiments, generic coherency response signals 305 and generic snoop response signals 317 may be split into a state response group and a data response group depending on the requirements of the generic coherence model.

Figure 4:
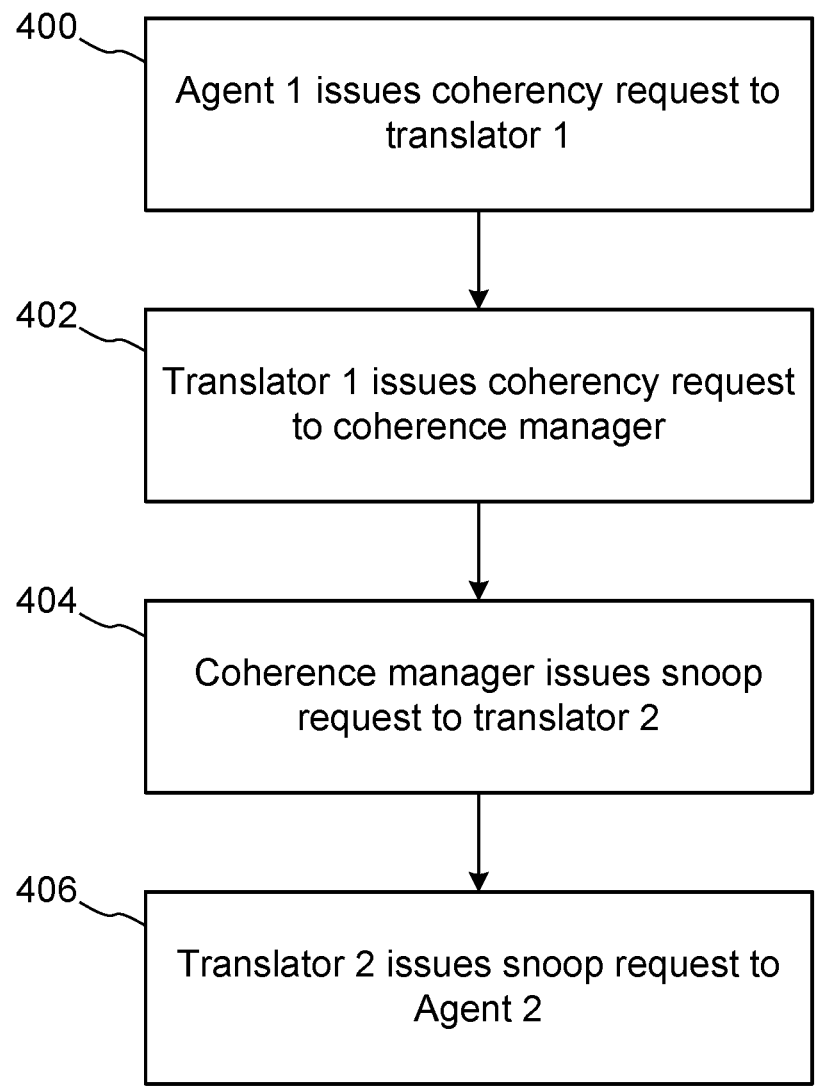
FIG. 4 illustrates a process of a generic coherency request causing a snoop in the cache of another heterogeneous agent.

FIG. 4 shows, in accordance with various aspects of the invention, a process of a coherency request from a first agent causing a snoop request at a second agent in a system where the first agent and the second agent both use incompatible native coherence models that differ from a generic coherence model used by a coherence controller, as in the system of FIG. 1. In initial step 400, the agent 100 issues a coherency request to the translator 102 according to its native coherence model. In subsequent step 402, the translator 102 issues a coherency request the coherence controller 104 according to a generic coherence model. In subsequent step 404, the coherence manager 104 issues a corresponding snoop request to the translator 106 according to its generic coherence model. In subsequent step 406, the translator 106 issues a snoop request to the agent 108 according to its native coherence model.

Figure 5:
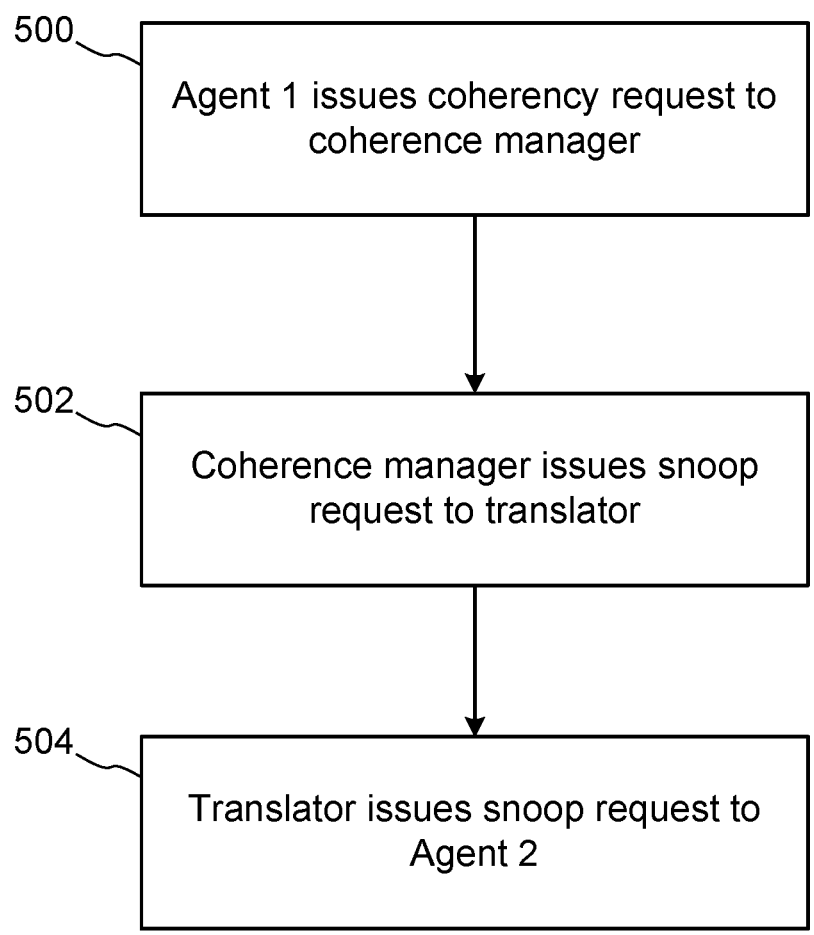
FIG. 5 illustrates a process of a coherency request according to one native coherence model causing a snoop in the cache of another agent with a different coherence model.

FIG. 5 shows, in accordance with various aspects of the invention, a process of a coherency request from a first agent causing a snoop request at a second agent in a system where the first agent and the coherence controller share a coherence model, as in the system of FIG. 2. In initial step 500, the agent 200 issues a coherency request to the coherence controller 204. In subsequent step 502, the coherence manager 204 issues a corresponding snoop request to the translator 206 according to its generic coherence model. In subsequent step 504, the translator 206 issues a snoop request to the agent 208 according to its native coherence model.

According to one aspect of the invention, a coherence controller only issues, to any particular agent, snoop requests that put a cache line into a state that is legal according to the snooped agent's coherence model and that is consistent with the state requested by the initiating agent. For example, if the coherence model for the initiating agent does not allow shared cache lines in other agents, a coherence controller will never issue a snoop request to a snooped agent that leaves a shared copy of data in the snooped agent, even if the coherence model for the snooped agent supports such an outcome.

According to some aspects and embodiments of the invention, the state of a cache line in any agent is generically represented within the coherence controller by four binary cache line characteristics:
- valid or invalid (V/I)—if valid, the line is present in the cache, and if invalid, the line is not present in the cache;
- owned or non-owned (O/N)—if owned, the agent must forward data in response to a snoop and may be required to update memory upon replacing the line in its cache, and if non-owned, the agent does not have these responsibilities;
- unique or shared (U/S)—if unique, the line is known to be present only in the agent's cache, and if shared, the line may be present in another agent's cache; and
- clean or dirty (C/D)—if clean, the agent may replace the line without updating main memory, and if dirty the agent must update memory upon replacing the line.

Common cache state models include MSI, MESI, and MOESI, among others, where each of the letters represents a cache state: Modified (M), Owned (O), Exclusive (E), Shared (S), and Invalid (I). An example of a cache state model that is widely used is the cache state model specified by the Advanced Microcontroller Bus Architecture (AMBA) AXI Coherency Extensions (ACE), which defines a five-state cache state model that is effectively equivalent to the MOESI cache state model. Some other cache state models may additionally define a Forward (F) state.

FIG. 6 shows, in accordance with various aspects of the invention, a table of cache states found in the cache state models of many agents, along with the equivalent state of each cache line characteristic of the generic coherence model.

According to one such embodiment, only IXXX, VNSC, VOUC, VOUD, VOSD, and VOSC states are legally recognized by the generic cache state model of the coherence controller. The four binary states are encoded in a representation that uses only three bits to identify the six legal states.

According to different aspects and embodiments, a generic coherence model may be a superset, subset, or partially inclusive of the cache state models, the transaction processing models, and the coherence granules defined by the native coherence models of the agents in the system.

According to some aspects and embodiments, a single request according to one coherence model causes a translator to issue multiple requests according to a second coherence model. When the translator issues multiple requests into the second coherence model in response to a request from the first, the translator also gathers and assembles the multiple responses from the second coherence model into a single response to the first. This is true for a single request according to one native protocol translated into multiple requests in the generic protocol or for a single request according to a generic protocol translated into multiple requests in a second native protocol.

According to some aspects and embodiments, a generic coherence model represents fewer than all possible valid states within an agent's native coherence model.

A coherence controller may be coupled to a system directory. In some aspects and embodiments, a system directory is an integral part of the coherence controller. In any case, according to some aspects and embodiments of the invention, it is not necessary for the system directory to be aware of, or even support the coherence model of agents.

Figure 7:
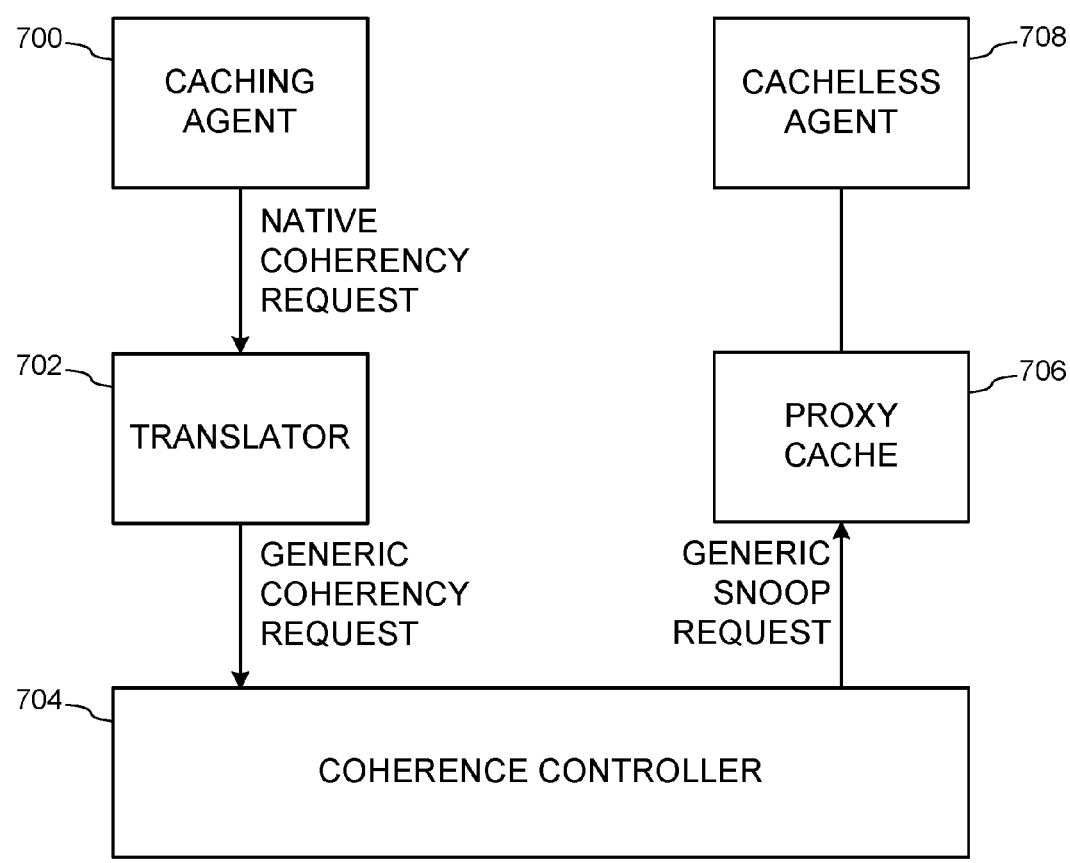
FIG. 7 illustrates a system of heterogeneous caching agents comprising a proxy between a non-coherent agent and a translator.

According to some aspects and embodiments, a system includes a proxy cache for a non-coherent agent. FIG. 7 shows, in accordance with various aspects of the invention, one embodiment of a system with a proxy cache according to the invention. Caching agent 700 issues coherency requests to translator 702 according to its native coherence model. Those cause translator 702 to issue coherency requests to coherence controller 704 according to a generic protocol. To control the cache in another agent, coherence controller 704 issues snoop requests to proxy cache 706 according to the generic coherence model. Proxy cache 706 acts as proxy cache for cacheless agent 708. However, proxy cache 706 need not issue any request to agent 708. Proxy cache 706 autonomously issues appropriate snoop responses to coherence controller 704 according to the generic protocol. No snoop translation is necessary.

According to FIG. 7, cacheless agent 708 issues non-coherent coherency requests to proxy cache 706. Proxy cache 706, in turn, issues corresponding coherent coherency requests to coherence controller 704. Coherence controller 704 issues snoop requests to caching agent 700, through translator 702. Caching agent 700 issues appropriate snoop responses to coherence controller 704, through translator 702. The coherence controller, in turn, issues snoop responses to proxy cache 706, which returns a non-coherent response to cacheless agent 708.

Some coherence models require self-snoops for purposes such as disambiguating coherency request ordering. Other coherence models do not require self-snoops. According to some aspects and an embodiment of the invention, a system comprises an agent that accords with a self-snooping coherence model and an agent that accords with a model that does not support self-snooping. When the self-snooping agent issues a coherency request to a coherence controller, the coherence controller issues a snoop to the initiating agent. When the non-self-snooping agent issues a coherency request to the coherence controller, the coherence controller snoops other agents, but does not snoop the initiating agent.

According to some coherence models, an initiating agent is required to serialize outstanding writeback coherency requests with respect to inbound snoop requests to the same cache line. In such a coherence model, the initiating agent blocks such snoop requests until the agent receives the corresponding coherency response for the writeback coherency request and then issues the snoop response for the snoop request. Furthermore, in this coherence model, the coherence controller must guarantee that writeback coherency requests make forward progress so that snoop requests can make forward progress.

According to some coherence models, the coherence controller is required to serialize outstanding snoop requests with respect to inbound writeback coherency requests to the same cache line. In such a coherence model, the coherence controller blocks such writeback coherency requests until the snoop responses for the snoop requests have been received.

Consequently, the native to generic translators must select a writeback coherency request with semantics in the generic coherence model appropriate to the corresponding native coherence models, and the coherence controller must either block the writeback coherency request or allow the writeback coherency request to proceed as needed.

According to some coherence models, agents respond with data in the S state (or SharedClean in ACE or VNSC in a generic coherence model). In one embodiment, a coherence controller that operates according to a generic coherence model, in reaction to coherency requests, issues snoops to multiple agents and, if multiple agents return data from the line in the S state, the coherence controller discards all but the first data response, which it issues in the coherency response to the initiating agent.

Figure 8:
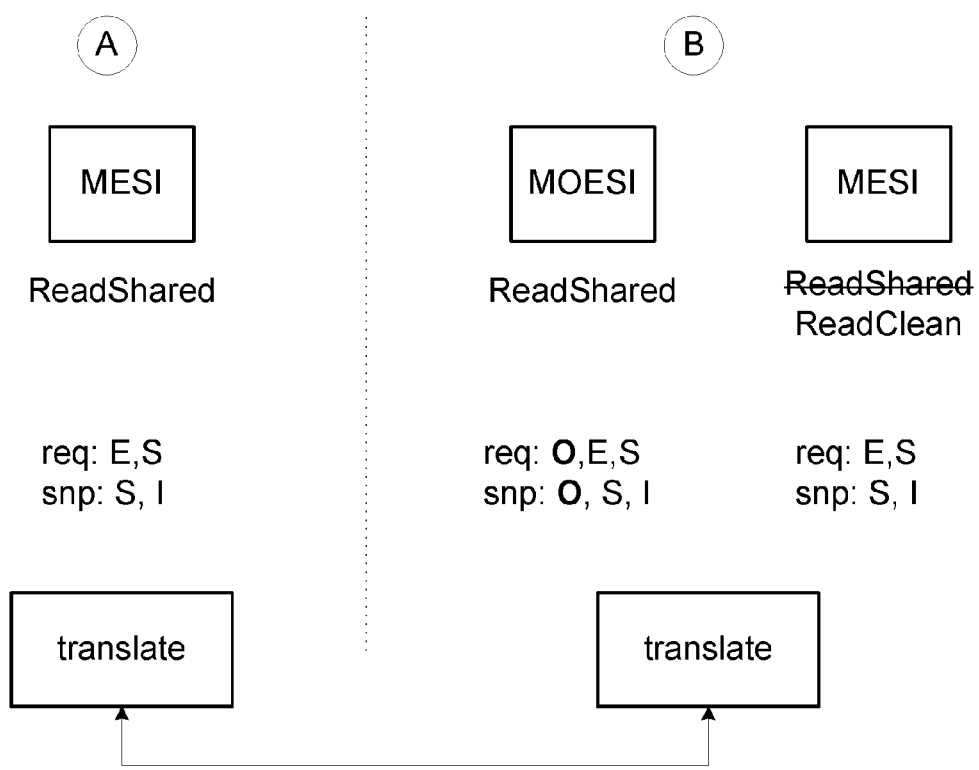
FIG. 8 illustrates a system of three agents, using two different caching models.

Referring now to FIG. 8, two coherence models are depicted. Coherence model A defines a single agent cache state model that consists of four cache states, MESI. Coherence model B defines multiple agent cache state models, including one that consists of four cache states, MESI, and one that consists of five cache states, MOESI. Both coherence models define a basic ReadShared coherency request that fetches a copy of a cache line for the initiating agent to satisfy an internal load operation and allows snooped agents to retain a valid, shared copy of the cache line.

In each of the two coherence models, however, the ReadShared coherency request and the corresponding ReadShared snoop request have different meanings. According to coherence model A, an initiating MESI agent, i.e. an agent that implements the MESI agent cache state model, issues a ReadShared coherency request to install a cache line in the M, E, or S state based on the coherency response. In response to a ReadShared snoop request, a snooped MESI agent in coherence model A may retain a valid copy, transitioning to the S state, or may invalidate its copy, transitioning to the I state. If a snooped MESI agent had a copy in the M state initially and then retained a copy in the S state in response to a ReadShared snoop request, an initiating MESI agent installs the copy in the S state, and memory must be updated with the dirty data transferred from the snooped agent.

On the other hand, according to coherence model B, an initiating MOESI agent, i.e. an agent that implements the MOESI agent cache state model, issues a ReadShared coherency request to install a cache line in the M, O, E, or S state based on the coherency response. Because the coherency response to a ReadShared coherency request may return shared, dirty data to the initiating agent, causing that agent to install a cache line in the O state, a MESI agent in coherence model B must not issue a ReadShared coherency request. Instead, coherence model B may define a ReadClean coherency request and snoop request. In this case, an initiating MESI agent issues a ReadClean coherency request to install a cache line in the E or S state based on the coherency response.

According to coherence model B, and in response to a ReadShared snoop request or a ReadClean snoop request, a snooped MOESI agent in coherence model B may retain a copy in the O or S state or may transition to the I state. In response to a ReadShared snoop request or a ReadClean snoop request, a snooped MESI agent in coherence model B may retain a copy in the S state or may transition to the I state. If a snooped MOESI agent had a copy in the M or O state initially, or if a snooped MESI agent had a copy in the M state initially, and then retained a copy in the S state in response to a ReadClean snoop request, an initiating MESI agent installs the copy in the S state, and memory must be updated with the dirty data transferred from the snooped agent. In coherence model B, a ReadShared coherency request does not require an update to memory since only MOESI agents issue such a request and those agents can install a cache line in all valid states including O.

According to various aspects and an embodiment of the invention, as shown in FIG. 8, what distinguishes a MESI agent in coherence model B from a MESI agent in coherence model A is that the former issues a specific coherency request to interoperate with a MOESI agent while the latter is unaware that a MOESI agent may be present in the system.

A generic coherence model, coherence model G, defines an agent cache state model with six cache states, MOESIF. Coherence model G also defines a MemRdShd coherency request and a SnpRdShd snoop request with behaviors compatible with the ReadShared requests defined by coherence model B; and defines a MemRdCln coherency request and a SnpRdCln snoop request with behaviors compatible with the ReadShared requests defined by coherence model A and the ReadClean requests defined by coherence model B.

In accordance with various aspects of the invention and an embodiment of a system with the coherence models described above, the translators in the system perform at least two functions: adapting requests and responses between agents in different coherence models; and transmitting requests and responses between agents in the same coherence model. In other embodiments, the translators in the system also adapt requests and responses between agents in the same coherence model.

Examples of coherency request and snoop request translation between coherence model A and coherence model B are described below. To clarify the examples, each coherency request or snoop request is designated with its corresponding coherence model, e.g. a ReadShared from coherence model A is written as ReadShared-A and a SnpRdCln from coherence model G is written as SnpRdCln-G.

Consider an embodiment, based on the various aspects of the invention, of the invention with three agents. The first agent uses coherence model A with a MESI agent cache state model. The second agent uses coherence model B with a MOESI agent cache state model. The third agent uses coherence model B with a MESI agent cache state model.

Figure 9:
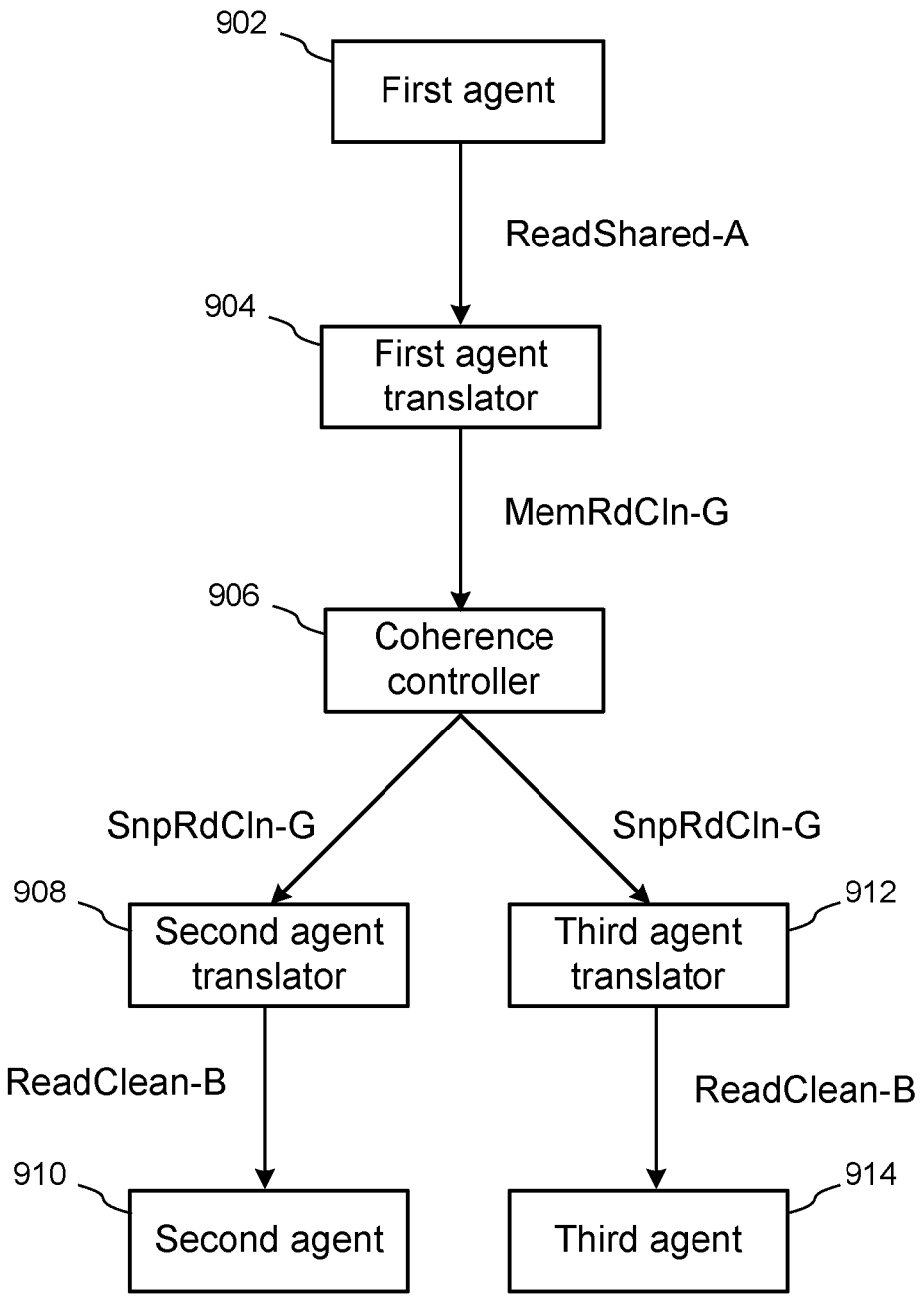
FIG. 9 illustrates a coherency read from an agent of a first coherence model causing snoops to agents of a second coherence model with different agent cache state models.

FIG. 9 shows, in accordance with various aspects of the invention, a scenario in which a coherency read from the first agent causes snoops to the second agent and the third agent. In this scenario, a coherency request in coherence model A is translated into snoop requests in coherence model B. A first agent 902 issues a ReadShared-A coherency request to a first agent translator 904. The first agent translator 904 translates the coherency request from the first agent 902 into the coherency request in the generic coherence model that is most consistent with the cache states of the first agent 902, i.e. MemRdCln-G. The first agent translator 904 issues a MemRdCln-G coherency request to a coherence controller 906. The coherence controller 906 issues a SnpRdCln-G snoop request to each of a second agent translator 908 and a third agent translator 912. Next, the second agent translator 908 and the third agent translator 912 translate the snoop request in the generic coherence model into the most appropriate snoop request in coherence model B, i.e. ReadClean-B. The second agent translator 908 issues a ReadClean-B snoop request to a second agent 910. The third agent translator 912 issues a ReadClean-B snoop request to a third agent 914. In effect, the translators adapt the request from the first agent 902 into requests to the second and third agents.

Figure 10:
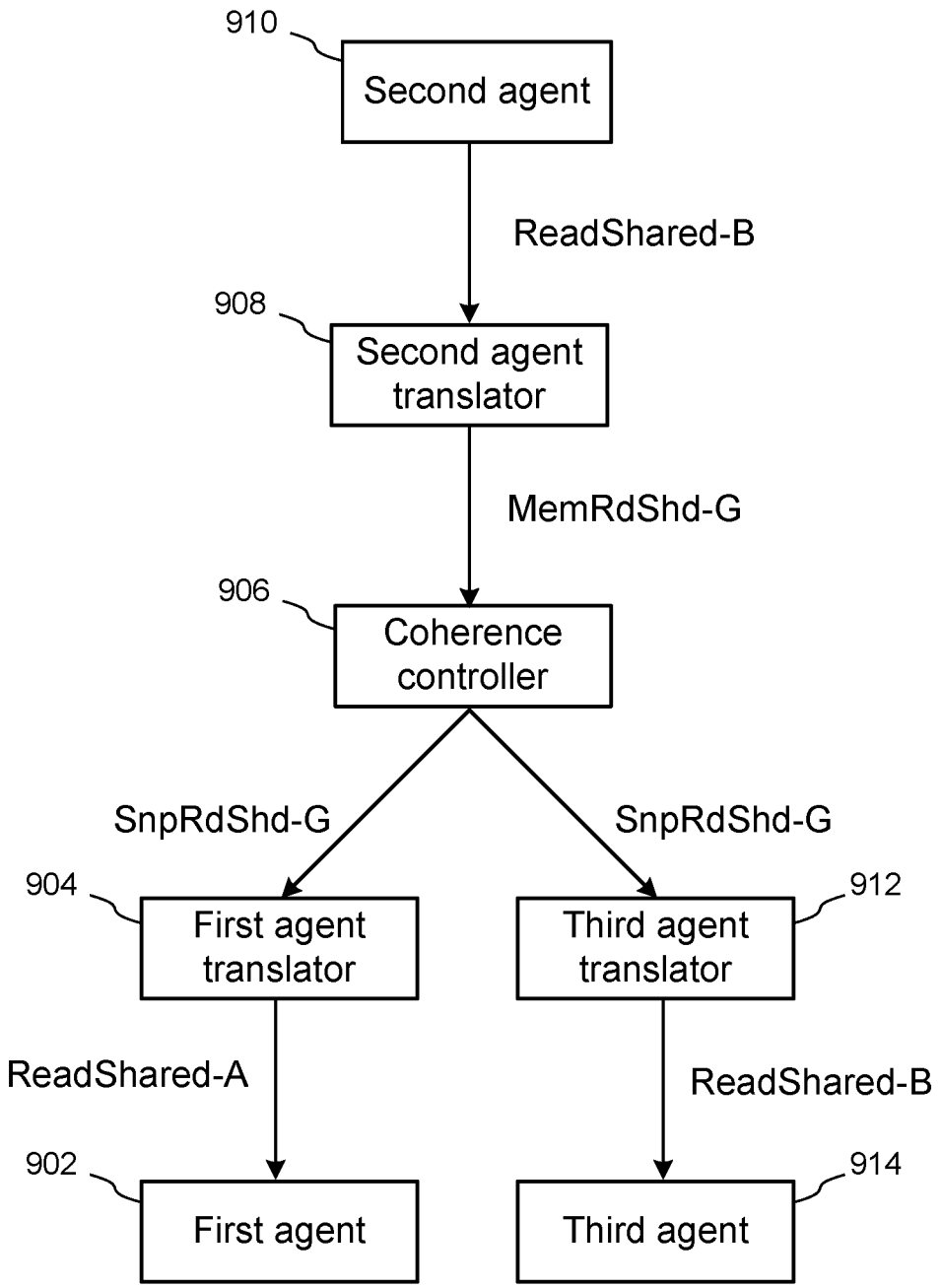
FIG. 10 illustrates a coherency read from an agent of a second coherence model causing snoops to an agent of a first coherence model and an agent with the second coherence model but a more restrictive agent cache state model.

FIG. 10 shows, in accordance with various aspects of the invention, a scenario in which a coherency read from the second agent 910 causes snoops to the first agent 902 and the third agent 914. In this scenario, a coherency request in coherence model B is translated into a snoop request in coherence model A and into a snoop request in coherence model B. The second agent translator 908 translates the coherency request from the second agent 910 into the equivalently defined coherency request in the generic coherence model, i.e. MemRdShd-G. The second agent 910 issues a ReadShared-B coherency request to the second agent translator 908. The second agent translator 908 issues a MemRdShd-G coherency request to the coherence controller 906. The coherence controller 906 issues a SnpRdShd-G snoop request to each of the first agent translator 904 and the third agent translator 912. For the first agent 902, the first agent translator 904 translates the snoop request in the generic coherence model into a snoop request in coherence model A that is consistent with generic snoop request, i.e. ReadShared-A. The first agent translator 904 issues a ReadShared-A snoop request to the first agent 902. For the third agent 914, the third agent translator 912 translates the snoop request in the generic coherence model into the equivalently defined snoop request in coherence model B, i.e. ReadShared-B. The third agent translator 912 issues a ReadShared-B snoop request to the third agent 914. In effect, the translators adapt the request from the second agent 910 into a request to the first agent 902 and simply transmit the request from the second agent 910 to the third agent 914, as those agents share the same coherence model.

Figure 11:
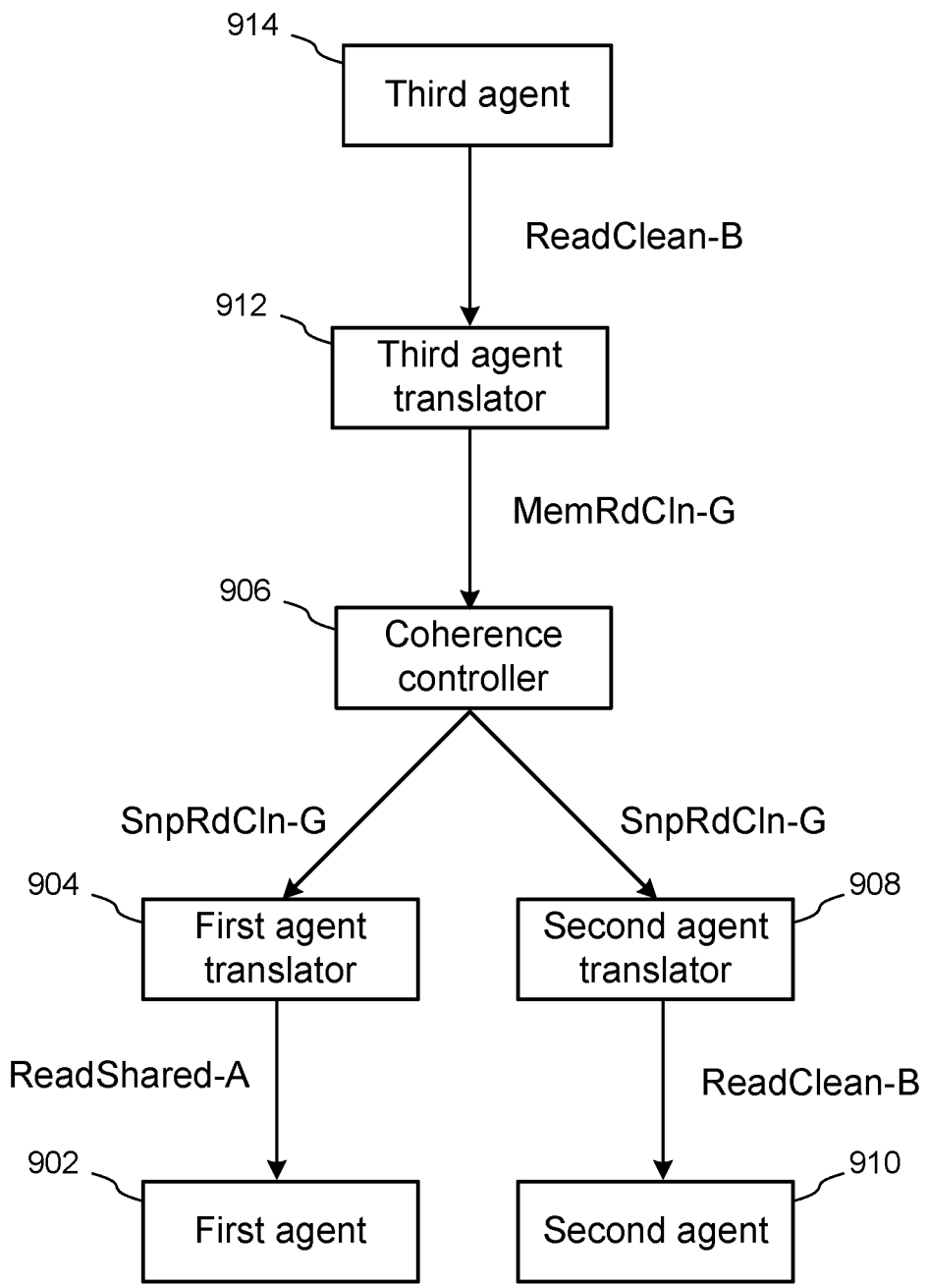
FIG. 11 illustrates a coherency read from an agent of a second coherence model causing snoops to an agent of a first coherence model and an agent with the second coherence model but a less restrictive agent cache state model.

FIG. 11 shows, in accordance with various aspects of the invention, a scenario in which a coherency read from the third agent 914 causes snoops to the first agent 902 and the second agent 910. Like the previous scenario, a coherency request in coherence model B is translated into a snoop request in coherence model A and into a snoop request in coherence model B. The third agent 914 issues a ReadClean-B coherency request to the third agent translator 912. The third agent translator 912 translates the coherency request from the third agent 914 into the equivalently defined coherency request in the generic coherence model, i.e. MemRdCln-G. The third agent translator 912 issues a MemRdCln-G coherency request to the coherence controller 906. The coherence controller 906 issues a SnpRdCln-G snoop request to each of the first agent translator 904 and the second agent translator 910. For the first agent 902, the first agent translator 904 translates the snoop request in the generic coherence model into a snoop request in coherence model A that is consistent with generic snoop request, i.e. ReadShared-A. The first agent translator 904 issues a ReadShared-A snoop request to the first agent 902. For the second agent 910, the second agent translator 908 translates the snoop request in the generic coherence model into the equivalently defined snoop request in coherence model B, i.e. ReadClean-B. The second agent translator 908 issues a ReadClean-B snoop request to the second agent 910. In effect, the translators adapt the request from the third agent 914 into a request to the first agent 902 and simply transmit the request from the third agent 914 to the second agent 910, as those agents share the same coherence model.

In accordance with various aspects of the invention, snoop responses and coherency responses communicate cache state and data. Responses may contain a state portion only or may contain both a state portion and a data portion. In some aspects and embodiments, responses may be divided into state responses, consisting of a state portion only, and data responses, consisting of a data portion only, that travel independently through the system. In such an embodiment, a data response has an associated state response, and a state response may or may not have an associated data response. In some aspects and embodiments, the state portion may be divided into a state response that communicates a subset of the state information and a data response that communicates the remaining subset of the state information along with the data; other divisions are also possible.

The state portion of a response typically indicates the cache state of one or more agents after the snoop requests have been processed. In some aspects and embodiments, the coherence controller aggregates the state portions from multiple snoop responses and issues a coherency response with a state portion that summarizes the state portions from the snoop responses. In other aspects and embodiments, a translator, typically the translator associated with the initiating agent, may be responsible for performing the aggregation of snoop responses and issuing the summary of the state portions in a coherency response. In yet other aspects and embodiments, the initiating agent may be responsible for performing the aggregation of snoop responses, if this function is defined by the coherence model, and each snoop response effectively becomes a coherency response. In these latter two examples, the translator or the initiating agent, via the translator, provides a summary to the coherence controller, if necessary.

In some other aspects and embodiments, multiple snoop responses with data portions may result from issuing snoop requests. In these embodiments, data aggregation may occur at the coherence controller, at the translator associated with the initiating agent, or at the initiating agent itself in a manner similar to one of those described above for aggregating state responses.

The state portion typically includes an indication of whether an accompanying or associated data portion is clean or dirty with respect to memory. A translator uses this indication in conjunction with the type of snoop request or coherency request to determine whether memory must be updated. In some embodiments, the translator associated with a snooped agent or the translator associated with the initiating agent may update memory, and in others, a translator may direct the coherence controller to update memory. If memory is updated, the state portion of the response is modified to indicate that the data are clean with respect to memory.

Examples of snoop response and coherency response translation between coherence model A and coherence model B are described below. In each coherence model, it is assumed that the state portion of a response has an indication of whether an agent has a shared or invalid copy and, if a data portion is associated with the state portion, an indication of whether the data are clean or dirty with respect to memory. These result in six response combinations: invalid state (Inv), invalid state with clean data (InvCln), invalid state with dirty data (InvDty), shared state (Shd), shared state with clean data (ShdCln), and shared state with dirty data (ShdDty). Not all response combinations are allowed in all coherence models, e.g. a ShdDty coherency response is not legal in coherence model A since a MESI agent in coherence model A does not support an O state.

Figure 12:
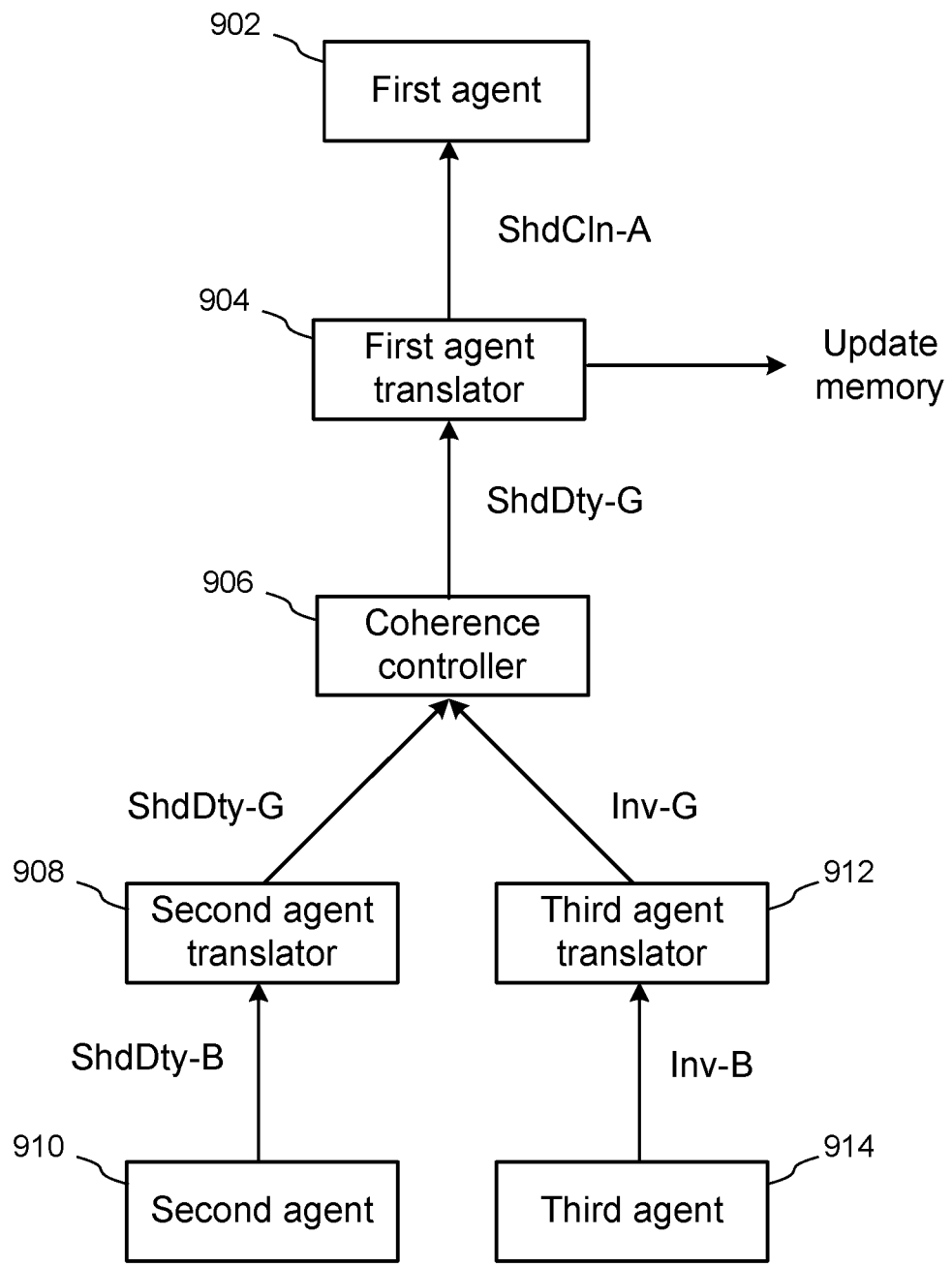
FIG. 12 illustrates a scenario of coherency responses of dirty data from agents of a second coherence model to an agent of a first coherence model.

FIG. 12 shows, in accordance with various aspects of the invention, a response scenario, corresponding to the request scenario illustrated by FIG. 9, in which the second agent 910 has a cache line in the O state and the third agent 914 has the cache line in the I state. In response to each ReadClean-B native snoop request, the second agent 910 issues a ShdDty-B native snoop response and transitions to the S state and the third agent 914 issues an Inv-B native snoop response. The second agent translator 908 translates the ShdDty-B native snoop responses into a ShdDty-G generic snoop response. The third agent translator 912 translates the Inv-B native snoop responses into an Inv-G generic snoop response. The two generic protocol snoop responses are aggregated by the coherence controller 906 into a single ShdDty-G generic coherency response issued to the first agent translator 904. The first agent translator 904 receives the ShdDty-G generic coherency response. However, the initial native coherency request from the first agent 902 was translated to MemRdCln-G, implying that clean data must be provided to the first agent 902. Consequently, the first agent translator 904 updates memory and translates the generic coherency response into a ShdCln-A native coherency response to the first agent 902.

In some aspects and embodiments, the second agent translator 908 recognizes that the generic snoop request, SnpRdCln-G represents a query for clean data and, in reaction to the ShdDty-B native snoop response, updates memory and translates the ShdDty-B native snoop response into a ShdCln-G generic snoop response. In some embodiments, instead of updating memory and translating the snoop response, the second agent translator 908 provides additional indication to the coherence controller 906 to update memory and translate the dirty generic snoop response into a clean generic coherency response. In some aspects and embodiments, data bypasses the coherence controller 906, and the coherence controller 906 only aggregates the state portions of the snoop responses. In such embodiments, either the second agent translator 908 or the first agent translator 904 updates memory.

Figure 13:
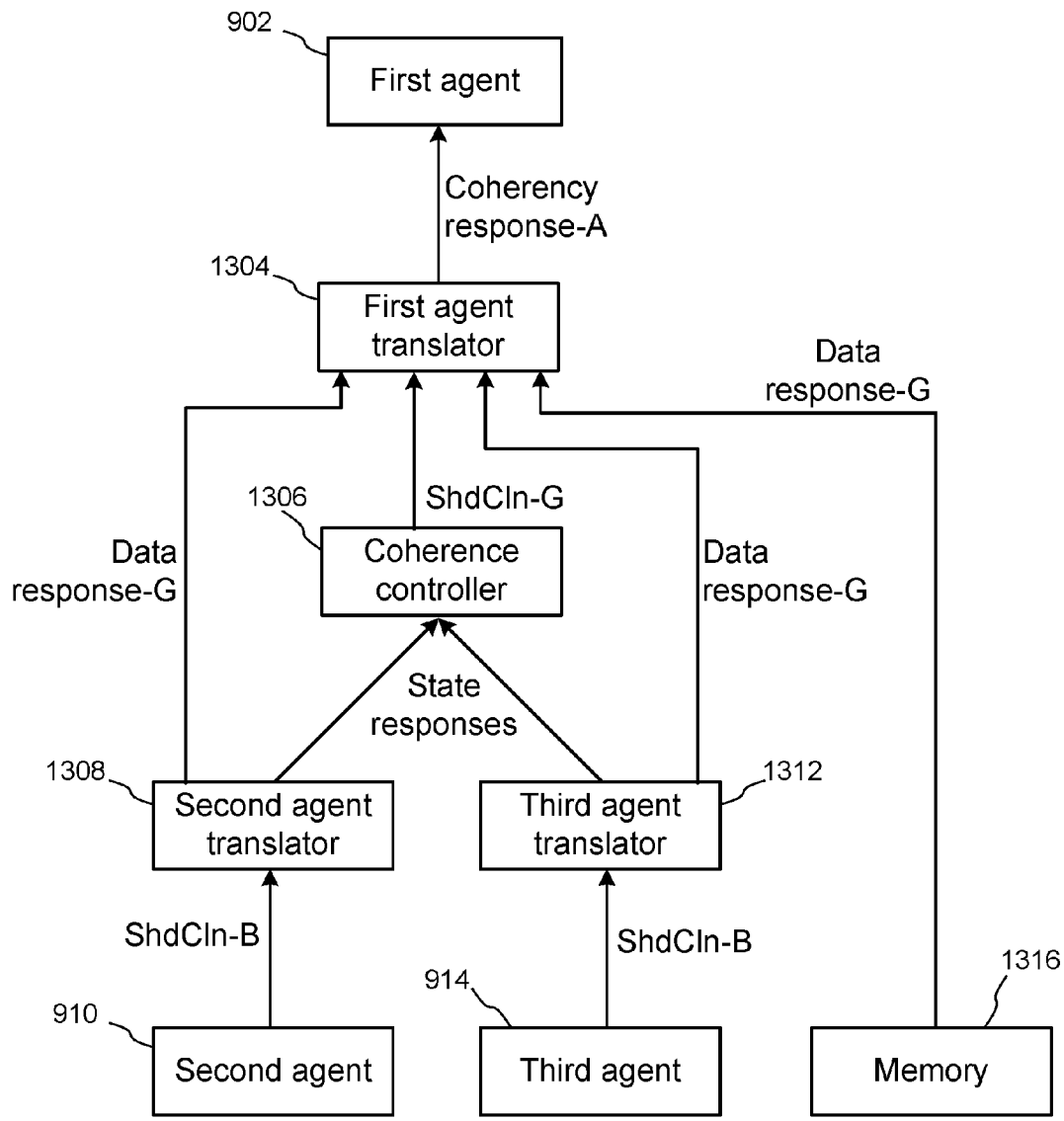
FIG. 13 illustrates a scenario of coherency responses of clean data from agents of a second coherence model to an agent of a first coherence model in a system in which state responses and data responses are separate.

FIG. 13 shows, in accordance with various aspects of the invention, another response scenario, corresponding to a request scenario similar to the one illustrated by FIG. 9, in which the second agent 910 has a cache line in the S state and the third agent 914 has the cache line in the S state. In the scenario of FIG. 13, coherent controller 1306 additionally issued a request to memory interface 1316 (requests are not shown in the figure). In response to each ReadClean-B native snoop request, the second agent 910 issues a ShdCln-B native snoop response and the third agent 914 also issues a ShdCln-B native snoop response. The second agent translator 1308 splits the ShdCln-B native snoop responses into a generic snoop state response to coherence controller 1306 and a generic data response directly to first agent translator 1304. The third agent translator 1312 splits the ShdCln-B native snoop responses into a generic snoop state response to the coherence controller 1306 and a generic data response directly to the first agent translator 1304. Memory interface 1316 provides a generic data response directly to the first agent translator 1304. The generic snoop state responses are aggregated by the coherence controller 1306 into a single ShdCln-G generic coherency state response to the first agent translator 1304, the generic coherency state response including an additional indication of the number of expected generic data responses, which is two, in accordance with some aspects of the invention. The first agent translator 1304 receives the ShdCln-G generic coherency state response with the number of expected data responses. However, in accordance with aspects and embodiment of FIG. 13, coherence model A requires a single native coherency response to be presented to the first agent 902. So, the first agent translator 1304 gathers the generic coherency state response and the three generic data responses before issuing the native coherency response to the first agent 902.

In some aspects and embodiments, translator 1304 issues a native coherency response after the generic coherency state response and the first generic data response have been received, and the first agent translator 1304 ignores the second and third generic data response. In some aspects and embodiments, the generic coherency state response is guaranteed to arrive before the generic data responses. In some aspects and embodiments, the generic coherency state response and the generic data responses may arrive in any order.

Machines claimed herein can be embodied in physical machines, such as semiconductor chips; in hardware description language representations of the logical or functional behavior of machines according to the invention as disclosed; and in one or more non-transitory computer readable media arranged to store such hardware description language representations. Methods claimed herein can be embodied in the behavior of either one or a combination of humans and machines; in instructions that, if executed by one or more computers, would cause the one or more computers to perform methods according to the invention as disclosed; and in one or more non-transitory computer readable media arranged to store such instructions. Inventions claimed herein, the practice of which require more than one non-transitory computer readable medium, should be construed as embodied by each of the more than one non-transitory computer readable medium.

Unless defined otherwise, all technical and scientific terms used herein have the same meaning as commonly understood by one of ordinary skill in the art to which this invention belongs. The verb "couple", its gerundial forms, and other variants, should be understood to refer to either direct connections or operative manners of interaction between elements of the invention through one or more intermediating elements, whether or not any such intermediating element is recited.

Any methods and materials similar or equivalent to those described herein are not considered abstract ideas and are considered to be significant improvements in the art when used in the practice of the invention. Representative illustrative methods and materials are also described. Additionally, it is intended that equivalents include both currently known equivalents and equivalents developed in the future, i.e., any elements developed that perform the same function, regardless of structure. The scope of the invention, therefore, is not intended to be limited to the exemplary aspects and embodiments shown and described herein.

In accordance with the various aspects of the invention a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/ or software) to receive data, transmit data, store data, or perform methods.

The article of manufacture (e.g., computer or computing device) includes a non-transitory computer readable medium or storage/memory that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computer or computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Accordingly, the preceding merely illustrates the various aspects and principles as incorporated in various embodiments of the invention. It will be appreciated that those of ordinary skill in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Therefore, the scope of the invention is not intended to be limited to the various aspects and embodiments discussed and described herein. Rather, the scope and spirit of invention is embodied by the appended claims.

What is claimed is:

1. A translator unit, implemented at least partially in hardware, for adaptation between different coherence models, the translator unit comprising: an agent interface unit for receiving a first coherency request according to a first coherence model; a coherence controller interface unit for issuing a second coherency request according to a second coherence model, wherein the first coherence model supports a first type of coherency request and the second coherence model supports a second type of coherency request, the first type of coherency request being incompatible with the second coherence model, and wherein the translator unit issues the second coherency request, which is a translated coherency request based on the first coherency request to a generic coherence model and then to the second coherence model and in compliance with the second coherence model, on the coherence controller interface unit in response to receiving the first coherency request on the agent interface unit.

2. The translator of claim 1, wherein the translator receives, at the coherence controller interface unit, a first response according to the second coherence model, the first response being in response to the second coherency request and the translator unit issues a second response according to the first coherence model on the agent interface unit.

3. A system for cache coherence comprising: a coherence controller unit; a first agent coupled to the coherence controller unit, the first agent issues coherency requests to the coherence controller unit; a translator unit, implemented at least partially in hardware, coupled to the coherence controller unit, the coherence controller unit issues snoop requests to the translator unit according to a generic coherence model; and a second agent coupled to the translator unit, the translator unit issues snoop requests to the second agent according to a native coherence model of the second agent based on translation of the first agent's coherency requests to the generic coherence model and from the generic coherence model to the native coherence model.

4. The system of claim 3, wherein the second agent sends a first response, according to the native coherence model of the second agent, to the translator unit.

5. The system of claim 4, wherein the translator unit sends a second response, according to the generic coherence model, to the first agent.

6. The system of claim 3, wherein the coherence controller unit issues self-snoops to the first agent and does not issue self-snoops to the second agent.

7. The system of claim 3, wherein, the coherence controller serializes outstanding snoop requests with respect to inbound writeback coherency requests to a cache line.

8. A system comprising: a coherence controller unit; a first agent that uses a first coherence model to issue requests and provide responses; a first agent translator, implemented at least partially in hardware, the first agent translator is in communication with the coherence controller unit and the first agent; a second agent using a second coherence model, which is at least partially incompatible with the first coherence model, to issue requests and provide responses; a second agent translator, implemented at least partially in hardware, the second agent translator is in communication with the coherence controller and the second agent; wherein the coherence controller unit receives requests from the first agent translator according to a generic coherence model and the coherence controller unit, in response, issues snoop requests to the second agent translator according to the generic coherence model and the second agent translator translates the snoop request from the generic coherence model to the second coherence model.

9. The system of claim 8 further comprising:
a third agent that uses a third coherence model, which is at least partially incompatible with the first coherence model, to issue requests and provide responses; and
a third agent translator, the third agent translator is in communication with the coherence controller unit and the third agent.

10. The system of claim 8, wherein the first agent, through the first agent translator, receives a coherency response from the coherence controller unit, the coherency response includes state information and data.

11. The system of claim 10, wherein the first agent translator is coupled to the second agent translator, the first agent translator gathers the coherency response from the second agent translator, which is according to the generic coherence model.

12. The system of claim 9 wherein the first agent translator is coupled to the second agent translator and the third agent translator, the first agent translator generates a coherency response, which includes state information and at least one of a data response from memory, a second data response from the second agent translator, and a third data response from the third agent translator.

13. The system of claim 8, wherein the second agent, through the second agent translator, issues coherency requests to the coherence controller unit according to the generic coherence model.

14. A system comprising: a first agent that uses a first protocol to issue requests and provide responses; a first translator unit, implemented at least partially in hardware, in communication with the first agent, the first translator unit converts outgoing communication, at the first agent, from the first protocol into a generic protocol and converts incoming communication to the first agent from the generic protocol to the first protocol; a second translator unit, implemented at least partially in hardware, in communication with the first translator unit; and a second agent in communication with the second translator unit, wherein the second agent uses a second protocol to issue requests and provide responses, wherein the second translator unit converts outgoing communication, at the second agent, from the second protocol into the generic protocol and converts incoming communication to the second agent from the generic protocol to the second protocol.

15. The system of claim 14 further comprising a coherence controller unit in communication with the first translator unit and the second translator unit, wherein the first translator unit issues coherency requests, originated from the first agent using the first protocol, to the coherence controller unit using the generic protocol and the coherence controller unit issues snoop requests to the second translator unit using the generic protocol and the second translator unit issues the snoop requests to the second agent according to the second protocol.

* * * * *